United States Patent [19]

Kohlpaintner et al.

[11] Patent Number: 4,883,311

[45] Date of Patent: Nov. 28, 1989

[54] SLIDING AND LIFTING ROOF FOR VEHICLES

[75] Inventors: Georg Kohlpaintner, Martinsried; Horst Bienert, Gauting, both of Fed. Rep. of Germany

[73] Assignee: Webasto AG Fahrzeugtechnik, Gauting, Fed. Rep. of Germany

[21] Appl. No.: 276,660

[22] Filed: Nov. 28, 1988

[30] Foreign Application Priority Data

Nov. 26, 1987 [DE] Fed. Rep. of Germany ....... 3740129

[51] Int. Cl.[4] .............................................. B60J 7/05
[52] U.S. Cl. .................................... 296/213; 296/214; 296/221
[58] Field of Search ................ 296/213, 214, 221, 223

[56] References Cited

U.S. PATENT DOCUMENTS

| 4,332,416 | 6/1982 | Lutz et al. | 296/216 |
| 4,537,442 | 8/1985 | Jardin | 296/221 |
| 4,664,439 | 5/1987 | Schaetzler et al. | 296/213 |
| 4,717,199 | 1/1988 | Kohlpaintner et al. | 296/214 |
| 4,749,227 | 6/1988 | Bienert et al. | 296/221 |

FOREIGN PATENT DOCUMENTS 3444606 7/1985 Fed. Rep. of Germany ...... 296/221

*Primary Examiner*—Charles A. Marmor
*Assistant Examiner*—Michael Mar
*Attorney, Agent, or Firm*—Sixbey, Friedman, Leedom & Ferguson

[57] ABSTRACT

Sliding and lifting roof for vehicles having a cover which, in its closed position, closes a roof opening in a fixed roof surface, which cover is mounted on lateral guide tracks and which can be pivotally raised to bring its rear end above the fixed roof surface, or after lowering of its rear end, can be rearwardly retracted below the fixed roof surface. A rain gutter that is displaceable in conjunction with the sliding movements of the cover underlies the rear edge of the roof opening when the cover is upwardly raised or closed, and is connected with a tilt assembly which induces the rain gutter to assume an inclined position when the cover is extended. The tilt assembly has control levers which are rigidly connected with the rain gutter and are pivotably connected to the cover at a fixed point. The rain gutter is pivotably connected at both sides to sliding elements which are displaceable along the guide tracks and which determine a pivot axis for the rain gutter, this pivot axis being disposed rearwardly of the rain gutter at a fixed distance above the guide tracks that is selected with respect to the pivotal points of the control levers such that, during the roof installation, a roof headliner can be slipped below the rain gutter from the rear.

20 Claims, 3 Drawing Sheets

SLIDING AND LIFTING ROOF FOR VEHICLES

BACKGROUND OF THE INVENTION

The invention relates to a sliding and lifting roof for vehicles, having a rigid cover which, in its closed position, closes a roof opening in a fixed roof surface, which cover is mounted on guide tracks extending parallel to the side edges of the roof opening, and which, selectively, can be tiltably raised so that its rear edge is disposed above the fixed roof surface, or can be slidably displaced along the guide tracks by a lowering of its rear end below the fixed roof surface. In particular, the invention relates to such a roof wherein said roof is also provided with a rain gutter which underlies the rear edge of the roof opening, whether the cover is raised or closed, by virtue of the rain gutter being connected with a tilt assembly which, in the cover's raised position, causes the rain gutter to assume an inclined position in which its forward edge is elevated, the tilt assembly having a control lever at each side of the roof opening that are fixedly connected with the rain gutter in the area of the rearward ends of the levers and are pivotably attached to the cover in the area of their forward ends at a fixed point which is closer to the rear edge of the cover than the forward edge thereof.

In a sliding and lifting roof of this kind, as is known from U.S. Pat. No. 4,664,439, the rain gutter is supported by cam followers which are fixedly connected to a lower rearward portion of the rain gutter and each of which ride on a cam portion of a guide element having an inclined surface, whereby the cam followers, simultaneously, form pivot supports for the tilting movements of the rain gutter when the cover is raised from its closed position to its upwardly tilted position. The displacement of the cover is effected by a transport bridge, which slides below the rain gutter when the cover is raised. The cam surfaces, having inclined planes, necessitate some increase in the overall height of the sliding and lifting roof, causing a reduction of headroom. Furthermore, if a roof headlining, as is known, for instance, from the disclosure of U.S. Pat. No. 4,717,199, is to be installed, such is made relatively difficult by the presence of the transport bridge.

Another sliding and lifting roof that is equipped with a displaceable rain gutter is disclosed in U.S. Pat. No. 4,537,442. In the case of this arrangement, the rain gutter is articulated to guides of the cover by pivot arms so as to pivot about the same axis as the cover, or the gutter may be articulated to the cover by the pivot arms at a point which is raised and rearwardly displaced relative to the cover pivot axis. However, this arrangement presents the very problems that the roof of the first-mentioned patent was specifically designed to avoid.

German Offenlegungsschrift No. 35 32 104 and the corresponding U.S. Pat. No. 4,749,227 disclose a sliding and lifting roof in which both sides of the rain gutter are connected with slide elements that travel along the tracks which serve to guide the cover. However, in this arrangement the rain gutter is rigidly secured to the sliding elements, preventing the rain gutter from being tilted when the cover is raised.

SUMMARY OF THE INVENTION

The present invention, therefore, has a primary objective of further developing a sliding and lifting roof of the kind initially mentioned so as to produce a particularly flat construction that facilitates easy installation of the roof headlining.

This objective is achieved, in accordance with a preferred embodiment of the invention, by pivotably connecting the rain gutter to a sliding element on each side of the roof opening, and by making the sliding elements, likewise, slidably displaceable along the guide tracks and by having them provide a pivot axis for the rain gutter, which is located at a distance rearwardly of the rain gutter and which, relative to the guide tracks, is of a predetermined fixed vertical height above the guide tracks. This objective of the invention is further achieved in that the position of the pivot axis for the rain gutter and that of the hinge points of the control levers at the point where they are connected to the cover, are selected such that, when the roof is installed, a roof headlining to be connected with the cover can be slipped through below the rain gutter, from behind.

The sliding and lifting roof of the present invention permits a particularly flat construction, while still facilitating the installation of the roof lining. As a rule, such roof linings are provided at the car manufacturing plant, in various colors matched to the other interior appointments of the vehicle. Accordingly, the selection of the roof liners is only made at the assembly line of the manufacturer, with the result that such roof liners cannot be premounted together with the operating parts of the sliding and lifting roof. In the case of the sliding and lifting roof of the present invention, which dispenses with a transport bridge, the roof liner simply can be loosely applied to the rear portion of the sliding roof frame during the roof mounting process, and can subsequently be slipped in from behind, below the rain gutter.

A particularly uncomplicated construction is obtained when, in accordance with a further development of the invention, the rain gutter is pivotably connected with the sliding elements via lifting arms, that are rigidly secured to the rain gutter, and which project rearwardly therefrom, in the area of the ends of the lifting arms which are directed away from the rain gutter. This connection forms a pivotal axis which is vertically disposed between the guide tracks and the bottom of the rain gutter.

Advantageously, the sliding elements for the lifting arms are guided on the tracks via sliding surfaces formed by jaw-like sliders which are slipped over the sliding elements. Each of the sliding elements may have a pivot pin serving as the pivot of the pivotal connection to the rain gutter, being received in an opening of a pivot bearing formed on the lifting arms. After insertion, clips may be used to secure the pin within the pivot bearing of the respective lifting arm. A particularly flat roof structure is further facilitated when, in accordance with a further feature of the invention, the position of the pivot axis of the rain gutter and that of the hinge points of the Control levers at the joint where they are fixed to the cover are selected such that, when the rear end of the cover is lowered, relative to the angle of the gutter in the closed position of the cover, the rain gutter is also lowered, at least in the area of its forward edge.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
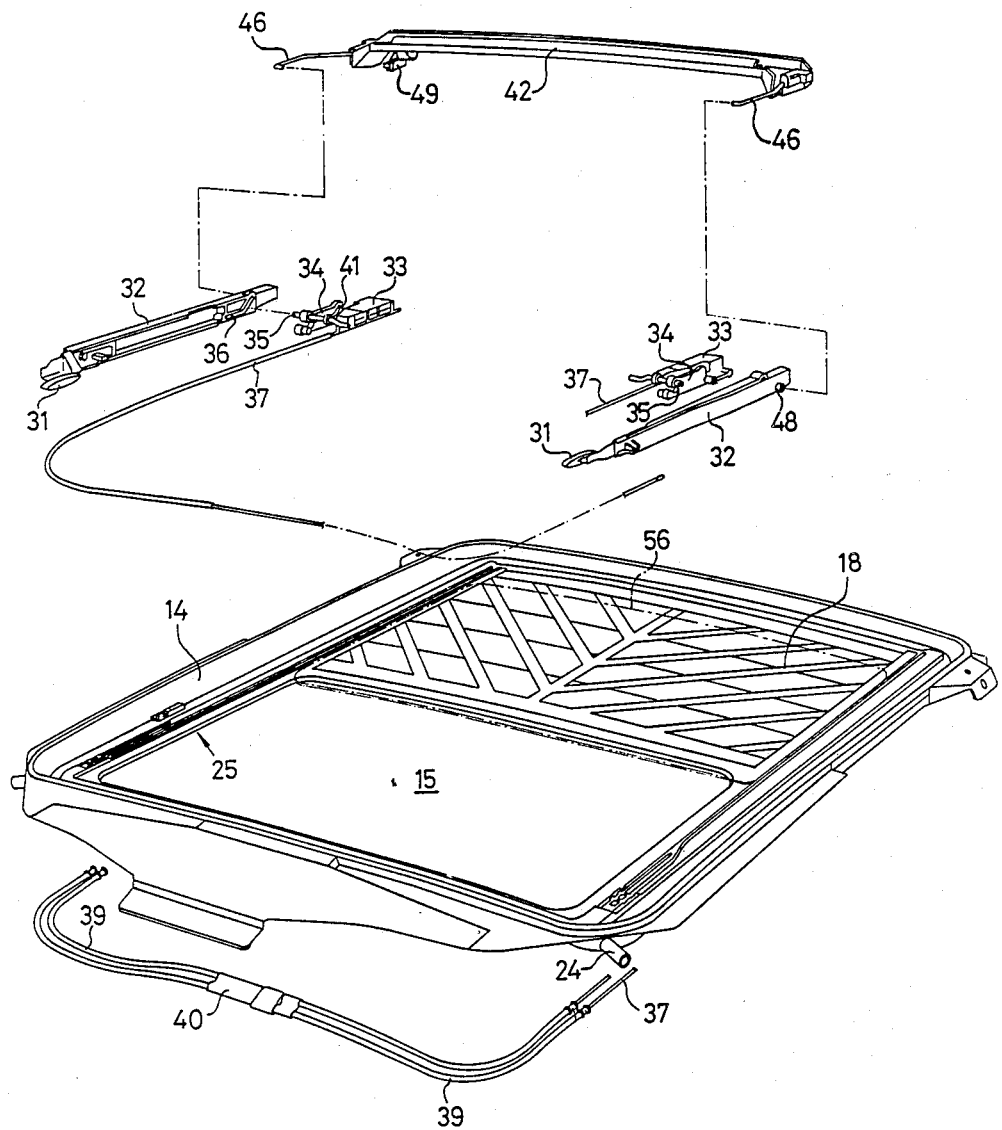
FIG. 1 is an exploded, perspective view of the major components of a sliding and lifting roof in accordance with a preferred embodiment of the invention.
Figure 4:
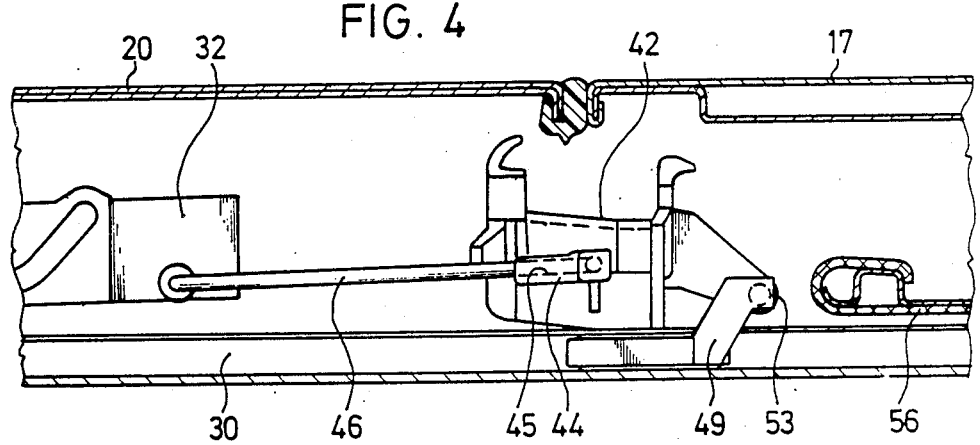
FIGS. 4 through 6 are sections taken along line IV—IV of FIG. 2 in three different positions of the cover and the displaceable rain gutter.
Figure 5:
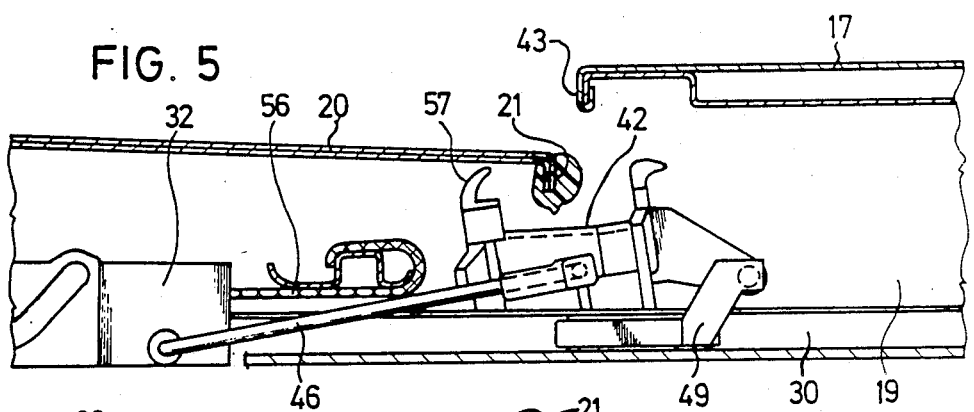
Figure 6:
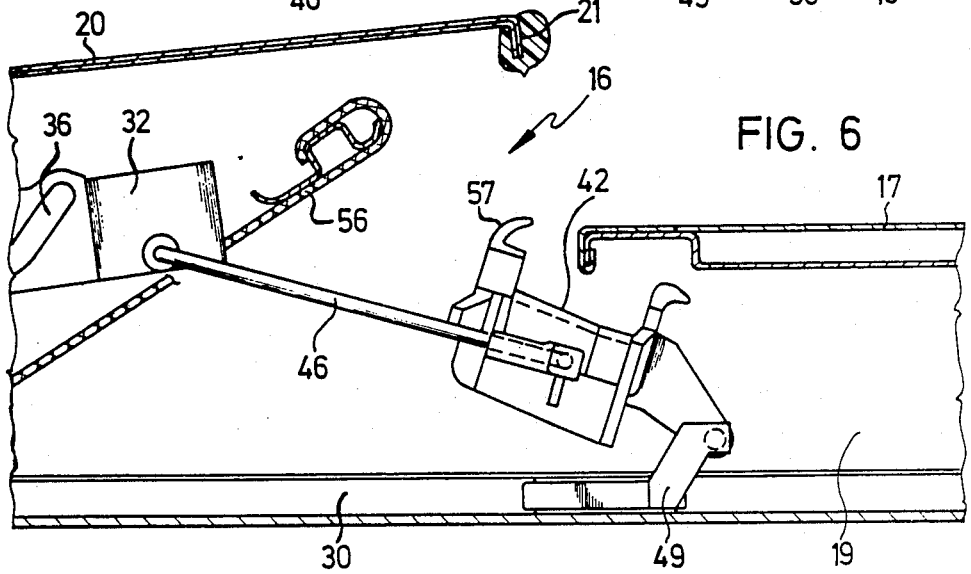

In accordance with FIG. 1, the sliding and lifting roof has a one-piece frame 14, preferably comprised of a molded material, such as a sheet molding compound (SMC). Frame 14 defines a frame opening 15 which, after installation of frame 14 in a vehicle, is aligned with a roof opening 16 of a fixed roof surface 17 (FIGS. 4 to 6). Frame 14 surrounds roof opening 16 and has a rearward portion 18 that is located below the fixed roof area 17 so as to form a cavity 19 rearward of the roof opening 16, in the vehicle longitudinal direction. A rigid cover 20, which is supported by frame 14, serves to close and at least partially expose roof opening 16. Cover 20 can be extended above the fixed roof surface 17 at its rear end 21 in a manner indicated in FIG. 6, or, alternatively, subsequent to lowering of its rear end portion 21, the cover 20 can be slidably retracted below the fixed roof surface 17 into cavity 19.

Frame 14, at its upper side, has a seal 22 which, during installation of the frame, is pressed against the fixed roof surface 17 from below. Adjacent to the roof portion having seal 22, there is a lower rain gutter 23 which collects water which may enter when the cover is extended or retracted. The water thus collected is led off in a conventional manner via drain pipes 24, which open into rain gutter 23. Rain gutter 23, in the area of lateral frame parts 25, is defined by an upwardly projecting frame formation 26 which, on the side adjacent rain gutter 23, has a horizontal guide surface 27 that is upwardly offset relative to the bottom of the rain gutter 23, and which adjoins a perpendicular guide surface 28. Guide surfaces 27 and 28, together with a cover rail 29 (which is placed upon frame formation 26), form a guide track 30 at each side of frame 14. These guide tracks 30 extend parallel to the side edges of roof opening 16.

Front sliders 31 are slidably guided in tracks 30 in the longitudinal direction of the vehicle. Cover supports 32 are mounted to front sliders 31, and cover 20 is fixedly supported, in turn, on these cover support members 32. Moreover, slide shoe-like members of rear sliders 33 are pivotably secured to one end of a lever-like lifting member 34, and also travel in guide tracks 30. Lifting members 34 have a retaining bracket pin 35 projecting laterally outwardly therefrom which is slidably displaceably guided in a retaining bracket slot 36 of cover support 32.

Each of the rear sliders 33 is firmly connected with one end of an incompressible drive cable 37. The drive cables 37 extend from the rear sliders 33 along the lateral frame parts 25 to the front, where they are guided in a cable channel 38 of frame 14. Near the front end of lateral frame parts 25, drive cables 37 enter a guide tube 39, and at reference numeral 40 are connected with a drive element, not depicted in detail, but described in greater detail in German Offenlegungsschrift No. 35 32 104. As a result of the sliding movement of the rear sliders 33, a retaining bracket guide 41 of lifting members 34 engages a retaining bracket pin rigidly secured at the frame, which causes lifting members 34 to be tilted, as is disclosed in more detail in German Offenlegungsschrift No. 35 32 104 and U.S. Pat. No. 4,332,416. The tilting movement of lifting members 34 induces the cover supports 32 to execute a pivoting movement around an axis determined by the front sliders 31, whereby the front sliders 31 are resiliently deformed in a known manner.

Additionally, a rain gutter 42 is provided which coacts with the sliding movements of cover 20. Gutter 42 underlies the rear edge 43 of roof opening 16, when cover 20 is in the forward end position (FIGS. 4 through 6). At both sides of rain gutter 42, there is a receiving member 44 having a longitudinally directed, forwardly open, receiving channel 45 into which the rear end of a control lever 46 is inserted, thus providing a rigid connection between the control lever 46 and rain gutter 42. Control levers 46 are turned laterally inwardly at their front ends 47, and the lever ends 47 are pivotably supported in a bearing sleeve 48 which is molded to the cover support 32 near its rear end. Bearing sleeves 48 constitute pivot points which are fixedly connected to the cover and which are disposed closer to the rear end 21 of cover 20 than the forward cover end.

Figure 2:
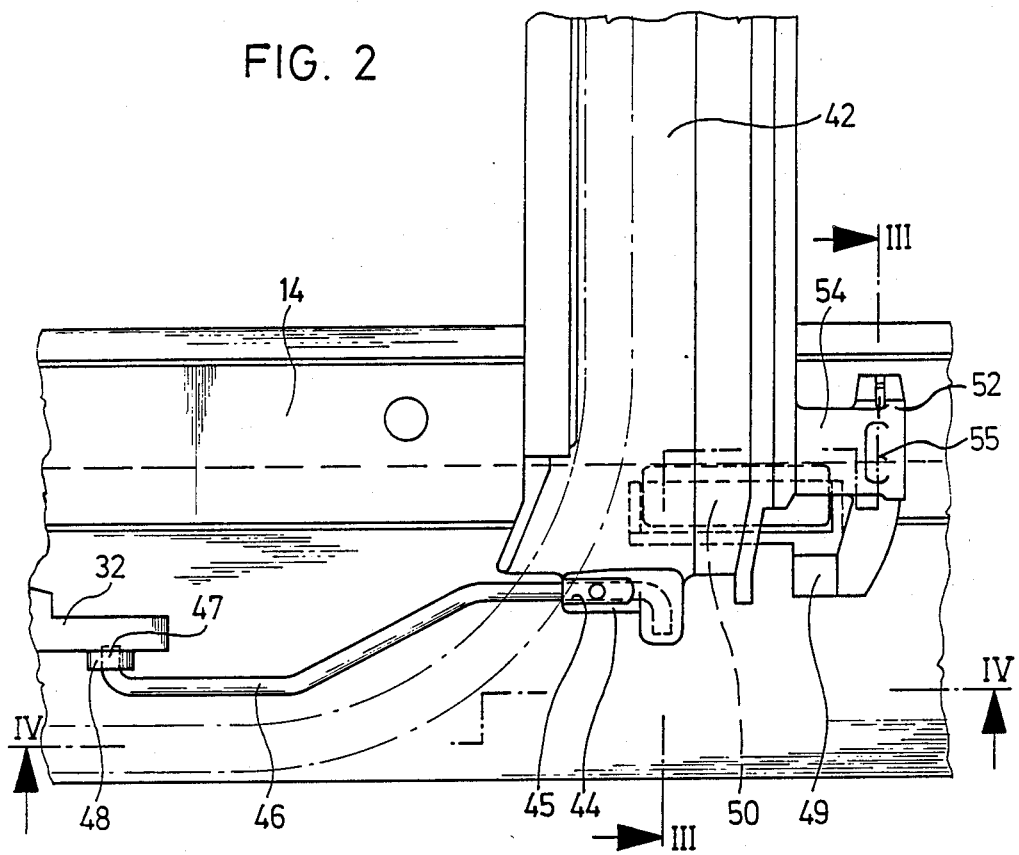
FIG. 2 is a partial top view, on an enlarged scale, of one side of the displaceable rain gutter and of the associated guide element and tilt assembly of the roof of FIG. 1.
Figure 3:
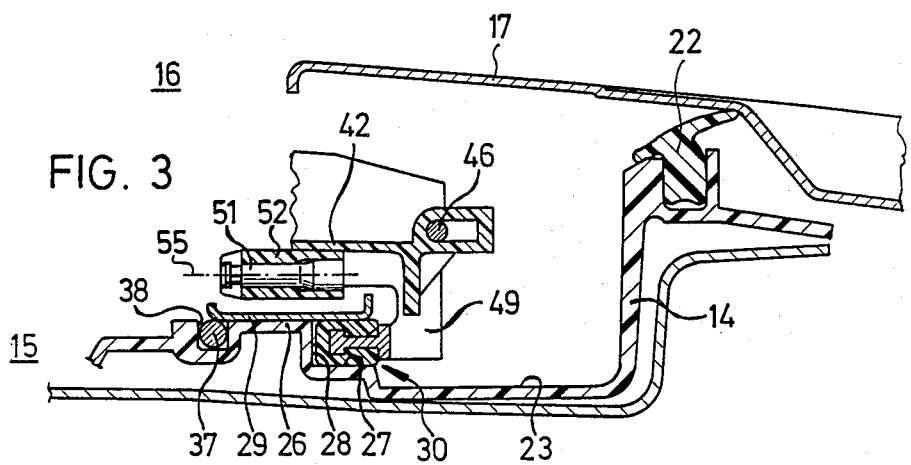
FIG. 3 is a sectional view taken along line III—III of FIG. 2.

Sliding elements 49 are slidably guided along the lateral guide tracks 30, behind rear sliders 33. For this purpose, a jaw-like slider 50, which preferably is resilient, is mounted onto each of the two sliding elements 49, and provides a sliding surface for the sliding elements which engages slide track 30. Each of the slide elements 49 carries a pivot 51 which protrudes laterally inwardly. Each of the pivots 51 is inserted into an opening formed in a respective pivot bearing 52, which bearing is molded to the rearward end of supports 54. Supports 54 are rigidly connected with rain gutter 42, preferably as one piece, and project rearwardly away from the rain gutter (FIG. 2). The pivots 51, and the pivot bearing 52 cooperating therewith, determine a pivot axis 55 for the rain gutter 42, which axis is located at a distance rearward of the rain gutter 42 and has a vertical height which is predetermined and is at a distance above the guide tracks 30. As can be seen from FIG. 3, in particular, pivot axis 55 has a vertical height situated between that of the guide tracks 30 and of the floor of rain gutter 42.

The distance of the pivot axis 55 from the rain gutter 42 in cover sliding direction, and the distance of pivot axis 55 from guide track 30 in a vertical direction, as well as that of the pivot points of control levers 46 at cover supports 32, are selected such that, during the installation of the roof, a roof headliner 56 loosely placed onto the rearward portion 18 of frame 14 can be slid below rain gutter 42, even if the roof frame height is very low. In a subsequent step, roof liner 56 is connected with cover 20 in a manner not depicted in detail. A detailed description of a known suitable connection between roof liner 56 and cover 20 is disclosed in U.S. Pat. No. 4,717,199, which is incorporated herein by reference to the extent necessary to complete an understanding of this invention.

Moreover, care is taken that, when the rear end of cover 21 (FIG. 5) is lowered, rain gutter 42 is also lowered (relative to its state in the closed cover position) to a certain degree, at least in the area of its forward end 57 (FIG. 4), whereby additional space is gained for sliding back cover 20 below the fixed roof area 17 without increasing the roof construction height. When raising cover 20 (FIG. 6), rain gutter 42 swings around pivot axis 55 via control levers 46 to such a degree that the forward edge 57 of the rain gutter 42 is lifted above the rearward edge of roof opening 16, causing rain or wash water which may have accumulated on the fixed roof surface 17 to be caught by the rain gutter 42 when there is a sudden braking action of the vehicle.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A sliding and lifting roof for vehicles of the type having a rigid cover mounted on guide tracks extending parallel to side edges of a roof opening formed in a fixed roof surface, said cover, in a closed position, closing said roof opening, being selectively raisable, at a rear edge thereof, above the fixed roof surface, and being slidably displaceable, by lowering of its rear edge, below the fixed roof surface; said roof further having a displaceable rain gutter which underlies the rear edge of the roof opening when the cover is raised or closed, the rain gutter being connected with a tilt assembly in a manner causing the rain gutter to assume an inclined position, in which a forward edge thereof is elevated, when the cover is raised, said tilt assembly having control levers, at each side of the roof opening, a rearward end area of said control levers being fixedly connected with the rain gutter and a forward end area of the control levers being pivotably attached to the cover at a fixed pivot point which is closer to the rear edge of the cover than the forward edge of the cover; wherein the rain gutter is pivotably connected at each side of the roof opening by a sliding element that is slidably displaceable along the guide tracks and provides a pivot axis for the rain gutter which is located at a distance rearward of the rain gutter and at a fixed predetermined vertical height above the guide tracks; said position of the rain gutter pivot axis and the location of the fixed pivot points of the control levers being selected in a manner enabling a roof headliner to be connected with the cover by being slid below the rain gutter from a position disposed rearwardly of the rain gutter.

2. Sliding and lifting roof according to claim 1, wherein the rain gutter is connected with each guide element by a support which is fixedly attached to the rain gutter and rearwardly projects therefrom to an area at which said pivot axis for the rain gutter is formed.

3. Sliding and lifting roof according to claim 2, wherein the predetermined vertical height of the pivot axis for the rain gutter is disposed between the height of the guide tracks and the bottom of the rain gutter.

4. Sliding and lifting roof according to claim 1, wherein the predetermined vertical height of the pivot axis for the rain gutter is disposed between the height of the guide tracks and the bottom of the rain gutter.

5. Sliding and lifting roof according to claim 4, wherein the sliding elements are guided in the guide tracks via jaw-like sliders which are mounted onto the sliding elements.

6. Sliding and lifting roof according to claim 2, wherein the sliding elements are guided in the guide tracks via jaw-like sliders which are mounted onto the sliding elements.

7. Sliding and lifting roof according to claim 1, wherein the sliding elements are guided in the guide tracks via jaw-like sliders which are mounted onto the sliding elements.

8. Sliding and lifting roof according to claim 7, wherein each of the sliding elements carries a pivot pin which serves to pivotably connect the rain gutter thereto.

9. Sliding and lifting roof according to claim 4, wherein each of the sliding elements carries a pivot pin which serves to pivotably connect the rain gutter thereto.

10. Sliding and lifting roof according to claim 2, wherein each of the sliding elements carries a pivot pin which serves to pivotably connect the rain gutter thereto.

11. Sliding and lifting roof according to claim 1, wherein each of the sliding elements carries a pivot pin which serves to pivotably connect the rain gutter thereto.

12. Sliding and lifting roof according to claim 10, wherein each pivot pin is received in an opening of a pivot bearing formed in a respective said support.

13. Sliding and lifting roof according to claim 12, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

14. Sliding and lifting roof according to claim 1, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

15. Sliding and lifting roof according to claim 2, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

16. Sliding and lifting roof according to claim 4, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

17. Sliding and lifting roof according to claim 5, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

18. Sliding and lifting roof according to claim 6, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

19. Sliding and lifting roof according to claim 8, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

20. Sliding and lifting roof according to claim 11, wherein the position of the rain gutter pivot axis and the location of the connecting points of the control levers are selected in a manner causing at least the forward edge of the rain gutter to be lowered, relative to the height thereof when the cover is in its closed position, when the rear edge of the cover is lowered for sliding displacement.

* * * * *